United States Patent Office 3,755,548
Patented Aug. 28, 1973

3,755,548
PRODUCTION OF ALUMINUM FLUORIDE
Eberhard Weise, Leverkusen, Manfred Schulze, Opladen, and Manfred Rothert, Leverkusen, Germany, assignors to Bayer Aktiengesellschaft, Leverkusen, Germany
Filed Aug. 11, 1971, Ser. No. 170,733
Claims priority, application Germany, Aug. 14, 1970, P 20 40 412.0
Int. Cl. C01f 7/50
U.S. Cl. 423—489           7 Claims

ABSTRACT OF THE DISCLOSURE

Reaction of aluminum oxide and gaseous hydrogen fluoride in a reaction zone in the presence of ammonia at a temperature of 400 to 700° C., condensation of gaseous products formed in said reaction zone, separation of ammonia from resulting condensate, precipitation of ammonium fluoride present in the condensate with reactive aluminum oxide and/or aluminum hydroxide to form ammonium cryolite, introduction of ammonium cryolite into said reaction zone and recovery of aluminum fluoride product.

---

Figure 1:
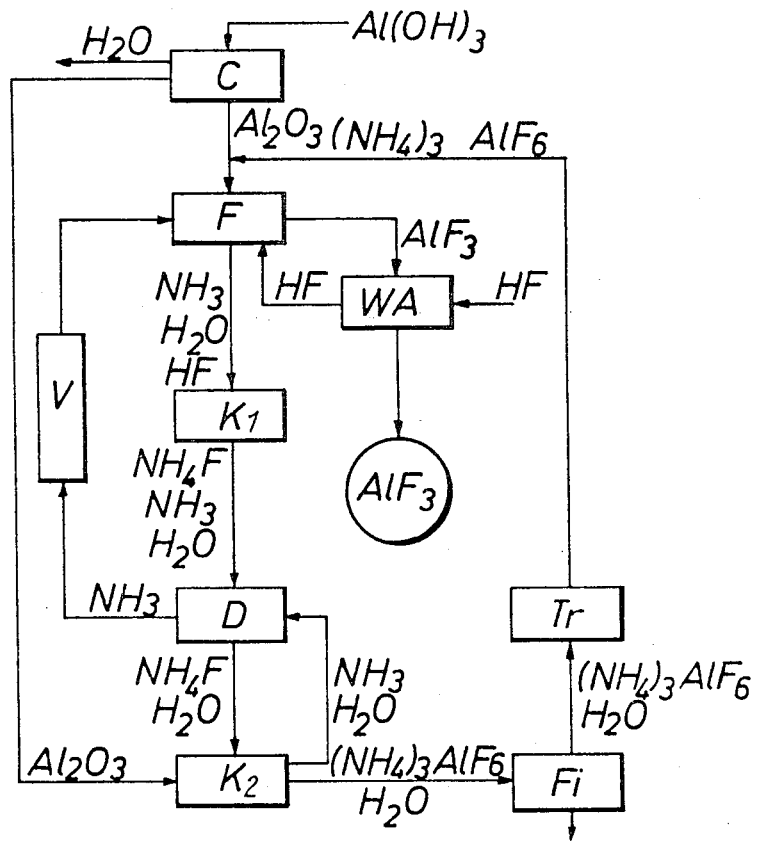

The invention relates to a process for the production of aluminium fluoride in a fluidised bed reactor.

The production of aluminium fluoride from aluminium hydroxide and gaseous hydrogen fluoride has been described in numerous patent specifications. As a rule, a multi-stage fluidised bed reactor is employed in which aluminium hydroxide is converted substantially completely into aluminium oxide in the uppermost stage by an endothermic reaction ($\Delta H^R_{298°\,K} = +37$ kcal./mol $Al_2O_3$) according to the equation:

$$2Al(OH)_3 \rightarrow Al_2O_3 + 3H_2O \qquad (1)$$

the hot reaction gases from the lower stages supplying the necessary heat for calcination. The aluminium oxide then passes through immersion pipes into the lower stages, where the reaction between aluminium oxide and gaseous hydrogen fluoride takes place at a temperature in the range of from 400° C. to 700° C. by an exothermic reaction ($\Delta H^R_{800°\,K} = -98$ kcal./mol $Al_2O_3$) in accordance with the following equation:

$$6HF + Al_2O_3 \rightarrow 2AlF_3 + 3H_2O \qquad (2)$$

In the lowermost stage of the reactor, the hot aluminium fluoride is cooled by gaseous hydrogen fluoride which in turn is heated almost to the reaction temperature. The production of aluminium fluoride from aluminium hydroxide and gaseous hydrogen fluoride in a three stage reactor is carried out by a process described in British patent specification No. 656,374 which the process described in French patent specification No. 1,309,300 employs a four-state reactor and the process described in Canadian patent specification No. 537,403 employs a seven-stage reactor.

In German Auslegeschrift No. 1,020,608, a three-stage fluidised bed reactor is described in which the overflow pipes run outside the reactor between the separate stages. This has the advantage that the overflow pipes can be cleaned from outside without the apparatus having to be dismantled. These multistage fluidised bed reactors are delicate apparatus which are liable to give trouble. Nevertheless, multistage fluidised bed reactors are used industrially because of the known advantage of cascade processes. The simultaneous carrying out of the three process steps (calcination, chemical reaction and cooling of the end product) for the production of aluminium fluoride in an apparatus comprising several stages entails considerable process technical difficulties which are due to the spontaneous liberation of water in the process of calcination and the temperature differences between the individual stages of the reactor. The sudden liberation of water prevents the formation of a stable fluidised bed in the uppermost stage of the reactor. The temperature differences between the individual stages produce thermal stresses in the material of the reaction vessel and therefore cause leakages at the flanges, which may be serious when using such a highly corrosive material as hydrofluoric acid. In the processes just described, additional energy must be supplied at the stage of calcination in an amount corresponding to the water content of the aluminium hydroxide which has undergone reaction. According to German patent specification No. 815,343, this problem is solved by arranging an oil burner underneath the calcination stage. Another method of producing aluminium fluoride in a fluidised bed reactor has been described in U.S. patent specification No. 2,996,354. In this process, the individual steps of the process (calcination, reaction and cooling) are carried out in three separate apparatus. The principle of the process is that the aluminium hydroxide is substantially calcinated by the reaction gases in a pretreatment zone, and the resulting aluminium oxide is then reacted with gaseous hydrofluoric acid to aluminium fluoride in a single stage fluidised bed reactor. Although efficient heat economy is achieved by this process, the expenditure required for the additional apparatus behind and in front of the main apparatus is very high.

It is known that very severe corrosion of the metal apparatus occurs in processes involving the use of hydrofluoric acid and fluorides under acid conditions. This is especially so when mixture of HF and $H_2O$ are formed at a temperature below the dew point. Severe corrosion also occurs both in the main apparatus and in subsidiary apparatus when aluminium hydroxide is reacted with gaseous hydrogen fluoride in a fluidised bed reactor unless highly corrosion resistant and therefore expensive materials are used for the apparatus. In conventional methods of producing aluminium fluoride in a fluidised bed reactor, it is not possible to prevent the waste gases from containing hydrogen fluoride. This hydrogen fluoride is utilised for the production of cryolite by washing the waste gases with sodium aluminate solution.

It is disadvantageous for economic reasons to combine the production of $AlF_3$ with that of $Na_3AlF_6$, and a process which utilises the hydrogen fluoride in the waste gasses of the reactor for the production of aluminium fluoride is therefore superior to the one which utilises it for the production of $Na_3AlF_6$.

It is also known to produce ammonium cryolite by reacting ammonium fluoride with aluminium hydroxide in aqueous solution (e.g. Z. anorg. allg. Chem. 3, 127 (1893)):

$$6NH_4F + Al(OH)_3 \rightarrow (NH_4)_3AlF_6 + 3NH_3 + 3H_2O \qquad (3)$$

It is advantageous in this process to use a large excess of aluminium hydroxide (about 100%) because otherwise the removal of ammonium fluoride will not be quantitative. If aluminium fluoride is required as the end product, the excess of aluminium hydroxide is not a disadvantage because aluminium hydroxide must in any case be added subsequently during the course of the following reaction with heat treatment:

$$(NH_4)_3AlF_6 + Al(OH)_3 \rightarrow 2AlF_3 + 3NH_3 + 3H_2O \qquad (4)$$

This method of producing aluminium fluoride has been described e.g. in Austrian patent specification No. 269,071.

Ammonium cryolite can also be thermally decomposed without the addition of aluminium hydroxide (Naturwissenschaften, 26, 529 [1938])

$$(NH_4)_3AlF_6 \xrightarrow{350°\,C.} 3NH_4F + AlF_3 \qquad (5)$$

The ammonium fluoride formed is then returned to the cycle.

Ammonium cryolite may also be obtained by a dry reaction of ammonium fluoride with aluminum oxides and hydroxides, and the ammonium cryolite formed may then be decomposed by heat or in the presence of aluminum oxides and/or hydroxides, e.g. according to the following equation:

$$2(NH_4)_3AlF_6 + Al_2O_3 \rightarrow 4AlF_3 + 6NH_3 + 3H_2O \quad (6)$$

(British patent specification Nos. 423,601 and 635,553).

Lastly, ammonium cryolite may also be prepared by reacting β-aluminum fluoride with ammonium fluoride in aqueous solution (German Auslegeschrift No. 1,811,178).

All the methods described above for the production of aluminum fluoride via the intermediate stage of ammonium cryolite necessitate heat treatment of $(NH_4)_3AlF_6$ at the end of the process (with or without $Al_2O_3$ or $Al(OH)_3$). Owing to the problems of corrosion and heat supply, no economically justifiable method has so far been recorded for carrying out this heat treatment on an industrial scale.

This invention relates to a process which may be carried out continuously for the production of aluminum fluoride from aluminum oxide and gaseous hydrogen fluoride at an elevated temperature in a fluidised bed reactor, which process is characterised in that an aluminum oxide is reacted with hydrogen fluoride in the presence of ammonia at a temperature in the range of from 400° C. to 700° C., the aluminum fluoride thus produced is removed from the reactor, the gases produced in the reaction are condensed, ammonia is driven from the condensate, and ammonium fluoride in the condensate is precipitated in the form of ammonium cryolite by means of reactive aluminum oxide and/or hydroxide, and the thusly precipitated ammonium cryolite is introduced into the reactor.

It has surprisingly been found that the production of aluminum fluoride in a fluidised bed reactor can be considerably improved by carrying out the reaction of aluminium oxide with gaseous hydrogen fluoride in the presence of ammonia.

The addition of ammonia has advantageous effects on the technical and chemical course of the process and hence opens up the possibility of obviating the disadvantages of the earlier processes.

As already mentioned above, processes carried out under acidic conditions in apparatus carrying hydrofluoric acid and fluorides are accompanied by severe corrosion. According to this invention, therefore, a basic atmosphere is produced in the reaction chamber and in the attached apparatus used for the production of aluminum fluoride in the fluidised bed reactor by adding ammonia to the reaction gases so that the medium used for the process is much less corrosive. The addition of ammonia virtually eliminates corrosion, especially in the apparatus attached to the fluidised bed reactor, in which the gas mixtures are cooled below the dew point, but in the fluidised bed reactor itself the addition of ammonia also substantially reduces the corrosive action of hydrogen fluoride, thereby enabling types of steel to be used which have a substantially lower nickel content than the fluidised bed reactors conventionally used for the production of aluminum fluoride.

It was also surprising to find that the presence of ammonia in the reaction of aluminum oxide with gaseous hydrogen fluoride in the fluidised bed reactor exerts a catalytic effect which results in increased volume/time yields. It is postulated that the reaction of aluminium oxide with gaseous hydrogen fluoride in the presence of ammonia takes place substantially as represented below, via the intermediate stages of ammonium fluoroaluminate complexes:

$$12NH_3 + 24HF \longrightarrow 12NH_4HF_2$$
$$12NH_4HF_2 + 3Al_2O_3 \longrightarrow 6NH_4AlF_4 + 6NH_3 + 9H_2O$$
$$6NH_4AlF_4 + Al_2O_3 \longrightarrow 8AlF_3 + 3H_2O + 6NH_3$$
$$\overline{24HF + 4Al_2O_3 \longrightarrow 8AlF_3 + 12H_2O}$$
$$6HF + Al_2O_3 \longrightarrow 2AlF_3 + 3H_2O$$

Other courses of the reaction, however, are also possible, and the process of the invention should in no way be limited by these theoretical considerations.

In the production of aluminium fluoride in a fluidised bed reactor, it is impossible to prevent hydrogen fluoride from entering the waste gas, especially if a high $AlF_3$ content is required in the end product. For reasons of health and also for economical reasons it is not permissible to discharge the hydrogen fluoride into the atmosphere. In the conventional fluidised bed plants used for the production of aluminum fluoride, the reactor waste gas which contains HF is washed e.g. with sodium aluminate solution, cryolite ($Na_3AlF_6$) being formed. This coupling of aluminium fluoride with cryolite is prevented when ammonia is used as an auxiliary component because the waste gas, which contains $NH_3$, $H_2O$ and HF, condenses and is worked up by distillation. An ammoniacal ammonium fluoride solution is formed from which the ammonia may be removed by means of a rectification column and returned to the cycle. Ammonium cryolite is precipitated from the aqueous ammonium fluoride solution by the addition of a reactive aluminum oxide or hydrated oxide, and after filtering and drying it is introduced into the fluidised bed reactor together with aluminium oxide. In this way, hydrogen fluoride which has not been reacted in the fluidised bed reactor is indirectly returned for the production of aluminum fluoride.

Ammonium fluoride from other processes may also be used as described above, e.g. $NH_4F$ formed by ammoniacal hydrolysis of $H_2SiF_6$.

The possibility of returning hydrofluoric acid from the waste gas into the fluidised bed reactor via the intermediate stages of ammonium fluoride and ammonium cryolite in the process according to the invention enables HF to be used in excess, based on the quantity of $Al_2O_3$ used, with the result that a higher yield of $AlF_3$ is obtained.

In addition to its anti-corrision and catalytic functions, ammonia also carries out a purely physical function. For obtaining a stable fluidised bed in which the chemical reaction takes place, it is best if the number of mols of the gaseous compound formed in the reaction is exactly equal to the number put into the reaction. In the reaction $$Al_2O_3 + 6HF \rightarrow 2AlF_3 + 3H_2O \quad (2)$$

in which the ratio of gas put into the reaction and gas formed is 2:1 per molar reaction, it is therefore advisable to bring this ratio close to 1 by the addition of an inert gas. If reaction (2) is carried out in such a manner that 1 mol of ammonia is available for 1 mol of hydrogen fluoride, then the ratio of gas volumes before and after the reaction is already 12:9=1.33 and therefore not far removed from 1.

Aluminium oxides are understood in the context of this invention to mean dehydrated or at least partly dehydrated aluminium hydroxides (hydrated oxides). Particularly reactive products are obtained by spray drying or impact calcination. Processes of this type have been described e.g. in German patent specification No. 1,241,-808 and British patent specification No. 896,966. Not only these highly reactive forms of aluminium oxide or partially dehydrated aluminium hydroxides (α-$Al_2O_3$, AlOOH and intermediate forms) may be used but also so-called N—$Al_2O_3$ (α-$Al_2O_3$) which is used for fusion electrolysis. Reactive aluminium oxide and/or aluminium hydroxides (hydrated oxides) are understood in the context of this invention to mean oxides and hydrated oxides of aluminium in general which have no corundum structure, e.g. $\gamma\text{-}Al_2O_3$, $Al(OH)_3$, $AlOOH$ and mixtures of these forms.

FIG. 1 is a flow diagram of the process according to the invention. The letters in the diagram have the following meaning:

C = calcination;
F = fluidised bed reactor;
$K_1$ = condensation;
D = distillation:
$K_2$ = vessel with stirrer;
V = preheater;
WA = heat exchanger
Tr = drier; and
Fi = filtration.

For the recovery of aluminium fluoride in the process described here, the quantity of gas added (consisting of hydrogen fluoride and ammonia) should be so calculated in relation to the diameter of the reactor and the loosening up point of the solid material that a stable fluidised bed is obtained. The proportion of ammonia must be at least sufficient to enable the hydrogen fluoride which has escaped to be bound in the form of ammonia fluoride and it should not exceed the volumetric throughput of hydrogen fluoride, in order that a sufficient volume/time yield may be obtained. Although the volumetric ratio of ammonia:hydrogen fluoride may range between 1:20 and 1:1, a mixture of 1 part by volume of ammonia to 2 parts by volume of hydrogen fluoride has been found to be the most suitable gaseous starting mixture. According to Equation 2, the quantity of aluminium oxide should be calculated to provide a maximum of 1 mole of reactive aluminium oxide to 6 mols of hydrogen fluoride. If desired, an excess of hydrogen fluoride may be used, up to 10% more than the stoichiometrically required quantity for a 90% $AlF_3$, but preferably an excess of 5% is used.

The ammonium fluoride solution which has been freed from ammonia and is discharged from the sump of the distillation column is treated with aluminium oxide to precipitate ammonium cryolite. A temperature of between about 80 and 110° C., preferably 95° C., is most satisfactory for this precipitation. Surprisingly, precipitation of ammonium fluoride is almost quantitative (about 97%) when a reactive aluminium oxide which has been prepared e.g. by impact heating of aluminium hydroxides is used in an excess of 5 to 20%, preferably 10%, of the stoichiometrically required quantity without applied pressure. In the process described here, this product is the preferred product used for the precipitation of ammonium cryolite from aqueous ammonium fluoride solution. The disadvantage of first having to carry out a dehydration when using aluminium oxide instead of aluminium hydroxide is more than compensatd by the improved reactivity of the product and by the fact that the precipitate thus obtained contains a smaller quantity of chemically bound water (in the form of aluminium hydroxide). Reaction (2) is exothermic, producing about 100 kcal. per mol of $Al_2O_3$ at 500° C. The quantity of heat liberated heats up the reaction mixture and therefore heat must be removed; the temperature in the reactor can be adjusted to the required level by varying the quantity of cooling medium. In the process according to the invention, the lowest operating temperature in the reactor is determined by the decomposition temperature of the ammonium fluoro aluminate complexes which are formed as intermediate products. It is in the region of 350° C. This temperature may be allowed to rise to 700° C. but is preferably kept within the range of from 450° C. to 550° C.

Owing to the formation of ammonium fluorides from hydrogen fluoride and ammonia, these two gases must be raised to a temperature above the decomposition temperature of ammonium bifluoride ($NH_4HF_2$) before they are introduced into the fluidised bed reactor. The two gases are therefore separately heated to at least 300° C. and preferably to 400° C. before being introduced into the mixing chamber underneath the lowermost inflow base.

Figure 2:
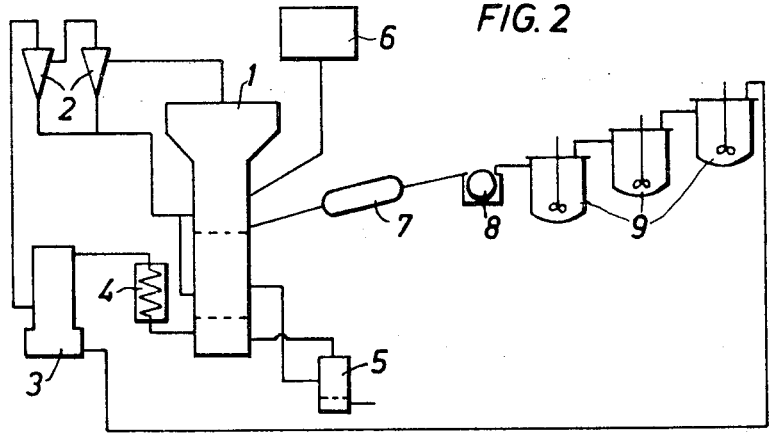

An apparatus suitable for carrying out the process according to the invention is illustrated in FIG. 2 in which the reference numerals have the following meaning:

1—Fluidised bed reactor;
2—Cyclone;
3—Rectification column;
4—Ammonia preheater;
5—Hydrogen fluoride preheater;
6—Drier;
7—Drying drum;
8—Filter; and
9—Cascade of stirrer vessels.

From the drier 6 e.g., an impact heating chamber according the British patent specification No. 896,966, aluminium oxide and from the drying drum 7 ammonium cryolite are conveyed into the fluidised bed reactor 1, each through a coil. The gases (ammonia and hydrogen fluoride) flow through the inflow bases shown in broken lines in the drawing into the reaction chamber (single stage or two-stage) where the conversion to aluminium fluoride takes place. The waste gases from the fluidised bed reactor ($H_2O$, $NH_3$ and $HF$) are condensed after the dust has been separated (in the cyclone group 2) and are then distilled in a column 3. Ammonia distills over the top of the separating column and returns to the fluidised bed reactor through the heat exchanger 4 while ammonium fluoride solution having an ammonium fluoride content of 10 to 20% by weight is discharged from the sump of the column. The reaction of ammonium fluoride with aluminium oxide to ammonium cryolite takes place in the cascade of vessels 9. The ammonium cryolite enters the fluidised bed reactor 1 after having been separated on the filter 8 and dried in the drum 7. The ammoniacal vapours from the cascade of vessels 9 are introduced into column 3 to remove ammonia. The heat exchanger 5 in which hydrogen fluoride is preheated with hot aluminium fluoride is constructed as a fluidised bed reactor. The crude gases from hydrofluoric acid production are used as source of hydrogen fluoride. Silicon tetrafluoride which is frequently present in the crude gas does not enter into reactions in the fluidised bed reactor. Silicon tetrafluoride is hydrolysed in the condensed ammoniacal waste gases and converted into ammonium fluoride and silicic acid. The silicic acid must be removed, which requires a filtration apparatus between the sump of the column 3 and the cascade of vessels 9. Sulphur dioxide which is normally present in the crude gases of hydrofluoric acid furnaces also does not enter into the end product but is removed from the condensed waste gas in the form of ammonium sulphite.

In an apparatus as shown in FIG. 2, 5.7 kg. of $Al_2O_3$ (95%), 2.5 kg. of $(NH_4)_3AlF_6$ (95% finely ground), 5.64 kg. of HF and 3.95 kg. of ammonia are introduced hourly into the two stage fluidised bed reactor. The hydrogen fluoride and ammonia had been heated to a temperature of 400° C. and the aluminium oxide to 450° C. The upper stage of the reactor was operated at 450° C. and the lower stage at 550° C. A 90 to 92% $AlF_3$ having an $NH_3$ content of less than 0.01% was obtained.

What is claimed is:

1. A process for producing aluminum fluoride which comprises reacting aluminum oxide and gaseous hydrogen fluoride at a temperature of 400 to 700° C. in the presence of ammonia in a fluidized bed reaction zone, condensing gaseous water, ammonia and hydrogen fluoride product obtained from said reaction zone to obtain water, ammonia and ammonium fluoride, removing ammonia from resulting condensate and introducing it into said fluidized bed reaction zone in an amount at least sufficient to convert hydrogen fluoride in said gaseous product to ammonium fluoride during said condensation, precipitating ammonium fluoride present in said condensate with reactive aluminum oxide, aluminum hydroxide or a mixture thereof to form ammonium cryolite, introducing resulting ammonium cryolite into said fluidized bed reaction zone and recovering resulting aluminum fluoride product.

2. The process of claim 1 wherein said temperature is between about 450 and 550° C.

3. The process of claim 1 wherein the volume ratio of ammonia:hydrogen fluoride is between 1:20 and 1:1.

4. The process of claim 1 wherein the volume ratio of ammonia:hydrogen fluoride is 1:2.

5. The process of claim 1 wherein 6 to 6.6 mols of hydrogen fluoride are employed per mol of reacted aluminum oxide.

6. The process of claim 1 wherein the ammonium fluoride formed on condensation is precipitated in the form of ammonium cryolite by the addition of a 5 to 20% stoichiometric excess of said reactive aluminum oxide, aluminum hydroxide or a mixture thereof.

7. The process of claim 1 wherein said precipitation of ammonium cryolite is carried out at a temperature between about 80 and 110° C.

References Cited

UNITED STATES PATENTS

| | | | |
|---|---|---|---|
| 1,300,110 | 4/1919 | Betts | 23—88 X |
| 2,981,597 | 4/1961 | Tarbutton et al. | 23—88 |
| 3,473,887 | 10/1969 | Chu et al. | 23—88 |
| 3,635,659 | 1/1972 | Kidde | 23—88 |
| 3,647,366 | 3/1972 | Thoonen | 23—88 |

FOREIGN PATENTS

| | | | |
|---|---|---|---|
| 656,374 | 8/1951 | Great Britain | 23—88 |
| 179,082 | 8/1935 | Switzerland | 23—88 |
| 149,408 | 1962 | U.S.S.R. | 23—88 |
| 220,970 | 1968 | U.S.S.R. | 23—88 |

EDWARD STERN, Primary Examiner

U.S. Cl. X.R.

423—135, 465, 470